US006776833B2

(12) United States Patent
Yap et al.

(10) Patent No.: US 6,776,833 B2
(45) Date of Patent: Aug. 17, 2004

(54) EMULSION OF BITUMEN IN A COLLOIDAL CLAY AND WATER SLURRY

(75) Inventors: Michael L. Yap, Oldsmar, FL (US); Raymont T. Hyer, Tampa, FL (US); Barton J. Malina, Tampa, FL (US)

(73) Assignee: Gardner Asphalt Corporation, Tampa, FL (US)

( * ) Notice: Subject to any disclaimer, the term of this patent is extended or adjusted under 35 U.S.C. 154(b) by 0 days.

(21) Appl. No.: 10/365,880

(22) Filed: Feb. 13, 2003

(65) Prior Publication Data

US 2003/0192456 A1 Oct. 16, 2003

Related U.S. Application Data

(63) Continuation-in-part of application No. 10/113,223, filed on Mar. 29, 2002, which is a continuation-in-part of application No. 09/887,383, filed on Jun. 22, 2001, now Pat. No. 6,616,743.

(51) Int. Cl.[7] .................... C08L 95/00; C09D 195/00
(52) U.S. Cl. ........................................ 106/277
(58) Field of Search .......................... 106/277

(56) References Cited

U.S. PATENT DOCUMENTS

| 4,056,401 A | 11/1977 | DeBough |
| 4,161,566 A | 7/1979 | Higgins |
| 4,193,815 A | 3/1980 | Burris |
| 4,405,375 A | 9/1983 | Gibson et al. |
| 4,437,896 A | 3/1984 | Partanen |
| 4,657,943 A | 4/1987 | Wietsma |
| 4,907,956 A | 3/1990 | Ezaki et al. |
| 5,224,990 A | 7/1993 | Vicenzi et al. |
| 5,266,538 A | 11/1993 | Knudson et al. |
| 5,340,391 A | 8/1994 | Grzybowski |
| 5,362,314 A | 11/1994 | Vicenzi et al. |
| 5,362,316 A | 11/1994 | Paradise |
| 5,364,894 A | 11/1994 | Portfolio et al. |
| 5,596,032 A | 1/1997 | Schilling et al. |
| 5,658,972 A | 8/1997 | Grzybowski et al. |
| 5,667,576 A | 9/1997 | Chatterjee et al. |
| 5,711,796 A | 1/1998 | Grzybowski et al. |
| 5,713,996 A | 2/1998 | Morris et al. |
| 5,840,105 A | 11/1998 | Helmstetter |
| 5,970,893 A | 10/1999 | Starita et al. |
| 5,981,632 A | 11/1999 | Fields |
| 6,245,850 B1 | 6/2001 | Fields |
| 6,267,809 B1 | 7/2001 | Boyer et al. |
| 6,451,885 B1 | 9/2002 | Dresin et al. |

FOREIGN PATENT DOCUMENTS

JP 402118931 A 5/1990

*Primary Examiner*—David Brunsman
(74) *Attorney, Agent, or Firm*—Jansson, Shupe & Munger, Ltd.

(57) ABSTRACT

An emulsion for sealants, coatings and/or mastics including a bitumen and a slurry of water and substantially fully hydrated colloidal clay is disclosed. The preferred emulsions include bentonite and a bitumen in preferred ratios such that the composition has characteristics adapted to cold application processes. Such emulsions are also disclosed as capably emulsifying high melt bitumens. Furthermore, a method of preparing such emulsions is disclosed.

20 Claims, No Drawings

EMULSION OF BITUMEN IN A COLLOIDAL CLAY AND WATER SLURRY

RELATED APPLICATIONS

This application is a continuation-in-part of pending application Ser. No. 10/113,223, filed Mar. 29, 2002, which, in turn is a continuation-in-part of application Ser. No. 09/887,383, filed Jun. 22, 2001 now U.S. Pat. No. 6,616,743. The disclosures of each pending application are incorporated herein by reference.

FIELD OF THE INVENTION

This invention relates generally to the field of sealants, coatings and mastics, and, more particularly to the use of emulsions as sealants, coatings and mastics for cold applications.

BACKGROUND OF THE INVENTION

The use of bitumens and/or blends thereof for sealant, coating and mastic applications is well known. Bitumens are mixtures of heavy hydrocarbons, essentially naphthenic and paraffinic, originating from the distillation of crude oils. These products are distillation residues and are classified by their physical properties, their chemical properties varying very widely as a function of the origins of the crude. Generally speaking, conventional crudes contain up to 30% bitumen, and heavy crudes up to 50%. As bitumen requirements of the majority of countries represent 2 to 4% of their crude oil consumption, this means that bitumen is available in very plentiful supply. Bitumens contain such a diversity of constituents that it is impossible to define their exact composition; nevertheless, it is possible to classify these constituents into major chemical families:

saturated compounds, essentially paraffinic;

aromatic compounds, in which 30% of the carbon atoms are included in aromatic cycles, with a sulphur content of around 2 to 3%;

asphaltenes, which are insoluble in hydrocarbons, are aromatic and rich in sulphur, nitrogen, and oxygen; they take the form of black brittle solids practically incapable of being melted.

For given bitumens, the percentage of these various families depends heavily on the extraction method used. Thus, products of this type are essentially classified by the following physical properties: penetrability (NFT 66-004), softening point (NFT 66-008), density (NFT 66-007), flashpoint (NFT 60-118), solubility (NFT 66-012) ductility (NFT 66-006), brittleness point. Commercially available bitumens, classified by penetrability index, are generally situated between 10 and 200.

Such bitumens and/or blends can be applied to surfaces using "hot application" or "cold application" methods. In hot applications, the composition is heated, typically to temperatures well over 100° F., in order to decrease viscosity of the composition to facilitate application to the intended surface. Such heating requires special equipment and experienced personnel. Obviously, it is desirable to avoid working with a hot material at a job site, which may be a roof top, roadway, or similar surface, thus there has been a trend toward cold application compositions.

Various technologies have been developed to provide for cold application. They involve placing the bitumen in a fluid media, or vehicle, allowing for application without requiring heating. After application, the bitumen solidifies or cures through the elimination, in most cases by evaporation, of the vehicle. The two most common vehicles are solvents and water.

When using a solvent as the vehicle, the bitumen must be soluble in the solvent. Most often, the solvent is a petroleum distillate. Petroleum distillates produce blends that are commonly referred to as cutbacks or road oils. They vary in viscosity and cure rate depending on the type of base bitumen, type of solvent, and composition.

In such cutbacks, bitumens of differing physical characteristics may be blended to offer improved performance characteristics, e.g., elongation, recovery, and weatherability. Organic and inorganic fillers may be utilized to provide reinforcement and resistance to flow. The introduction of elastomers may be accomplished via solvation in aromatic and aliphatic hydrocarbon solvents, or combinations thereof. In such cases large amounts of various solvents are typically necessary to decrease the viscosity of the composition to facilitate spreading on the intended surface at ambient temperature. Cutbacks have been used successfully in products for use as sealants, roof coatings and roof patches, mastics including plastic cements and the like. However, while these solvent-based compositions have great long term durability including a high degree of water resistance, the required use of large volumes of solvents results in the release of high levels of volatile organic compounds ("VOCs") when the solvents evaporate as the compositions dries.

Many VOCs are known to be highly toxic and present health dangers. Others harm air quality, contribute to the creation of smog and are suspected to escalate global warming. Due to increasing concern over the effects of VOCs on humans and the environment, the need for compositions having lower levels of VOCs has become a high priority in the fields of sealants, coatings and mastics.

The use of water as the fluid media requires the action of surface active agents (emulsifiers). A mixture of water and bitumen produces a dispersion commonly called an emulsion. Bitumen emulsions consist of two types, those in which the bitumen is dispersed in an external or continuous phase of water, and those in which the water is dispersed in the external phase of bitumen.

The use of emulsions as compared to bitumen cutbacks is becoming increasingly popular as the product of choice for the non-heated applications. This is because of the dangers and hazards of solvent-containing compositions to the environment and hazards with employee exposure to solvents in manufacturing and application as discussed above. Storage stability, freeze thaw stability, limited compatibility with auxiliary additives, and low binder (bitumen solids) contents are deficiencies in current bitumen emulsions which hinder and often restrict their use.

For many years various clays have been used in combination with both petroleum- and coal tar-derived bitumens to form aqueous emulsions. These so-called "colloidal clays" have many of the chemical and physical properties necessary to suspend the bitumen in the aqueous phase, providing the emulsion the consistency and stability desired. However, colloidal clay emulsions have a tendency to phase-separate: the bitumen and clay particles (when in the discontinuous phase) settle over time, becoming a dense mass. Reblending into a homogeneous colloidal emulsion is often difficult and time-consuming. Phase-separation is especially troublesome and costly when extensive reblending is required just prior to application. The consequences of applying a phase-separated emulsion are even more undesirable and include: inadequate coverage rates, disabled spray equipment, non-uniform curing rates, varying cured-coating performance properties, and discolored and unsightly coating appearances, to mention but a few.

In order to reduce phase separation, manufacturers have attempted to achieve sufficient dispersion by extensive mixing of the water and colloidal clay slurry, typically for over 8 hours and often for much longer. However, such extensive mixing has still not led to a sufficiently stable bitumen emulsion nor sufficient hydration of the clay.

Concern over phase separation and the problems associated with it fostered the use of water-soluble gums, including cellulose ethers, which retard phase separation by absorbing water from the aqueous phase and increasing emulsion viscosity. While this approach is relatively inexpensive and alleviates many of the aforementioned concerns, it has associated with it a number of significant problems and deficiencies. Most are related to inadequate emulsion performance and phase-separation.

Another significant problem with the use of water-soluble gums is the required addition of biocides. Cellulose thickeners are, for the most part, vegetable matter. For example, cellulose gums are derived from various sources, including wood pulp and cotton. These materials support fungal and bacterial life, the bi-products of which are weakly acidic and may later "sour" the emulsion causing phase separation. As a preventative measure, synthetic biocides must be added during emulsion formulation and represent an extra production cost.

In summary, a considerable number of drawbacks and problems exist in the art relating to bituminous emulsions. There is a need for an improved emulsion composition. The applicants have consequently set out to obtain bitumen emulsions which retain stability, avoid flocculation, and achieve the desired characteristics for application while avoiding complex or expensive formulations.

OBJECTS OF THE INVENTION

A primary object of the present invention to provide emulsions for use as sealants, coatings and/or mastics which may be easily and efficiently manufactured and applied.

Another object of the invention is to proved a cold application emulsion which is of durable and reliable construction.

Another object of the invention is to provide a low cost method of manufacturing a cold application emulsion.

Another object of the invention is to reduce settling and storage separation in cold application emulsions of sealants, coatings and/or mastics.

Yet another object of the invention is to allow for precise viscosity control in a cold application emulsion.

Another object of the invention is to provide an emulsion for cold application of sealants, coatings and/or mastics which has little or no VOCs.

Another object of the invention is to provide an emulsion for cold application of sealants, coatings and/or mastics which provides for increased spreadability, greater control of spread rates, and more uniform film thickness.

Another object of the invention is to provide an emulsion for cold application of sealants, coatings and/or mastics which results in increased abrasion and track resistance.

Still another object of the invention is to provide a stable emulsion of a bitumen in a slurry of substantially fully hydrated colloidal clay and water.

Still another object of the invention is to provide a stable emulsion of a high melt bitumen in a slurry of colloidal clay and water.

Still another object of the invention is to provide a method of quickly producing a slurry of substantially fully hydrated colloidal clay and water for emulsifying a bitumen.

These and other objects of the invention will be apparent from the disclosure and discussion herein.

SUMMARY OF THE INVENTION

This invention is an emulsion of bitumen in a colloidal clay and water slurry. The invention represents a significant advance over the state of the art by providing novel elements to provide increased stability and performance characteristics.

The inventive method of preparing an emulsion for use during cold applications comprises: providing a slurry of water and substantially fully hydrated colloidal clay; providing a bitumen; melting the bitumen; and mixing the bitumen with the slurry to create the emulsion. The method may also include creating the slurry by mixing the water and colloidal clay in a high-speed disperser, preferably at a rate between about 1500–5000 rpms, most preferably at about 3000 rpms. The water and colloidal clay are preferably mixed until the colloidal clay is substantially fully hydrated, i.e., the clay can no longer absorb any more water, which the disperser accomplishes in less than 30 minutes, preferably in about 10–15 minutes.

In the inventive method, the bitumen preferably comprises about 5–50% of the emulsion by weight, the colloidal clay preferably comprises about 1.5–8% of the emulsion by weight and the water preferably comprises about 15–55% of the emulsion by weight. For certain uses, the emulsion may comprise as much as 66% water.

In certain preferred embodiments, the bitumen is asphalt or coal tar and is preferably a high melt bitumen, i.e., it has a melting point of between about 120° F. to 160° F. or higher. In certain other preferred embodiments, the bitumen has a melting point of at least about 180° F. or of at least about 200° F.

The preferred colloidal clay is bentonite, most preferably treated bentonite. Treatment of bentonite typically consists of adding 0.2–2% polyacrylic acid and/or vinyl acrylic terpolymer in the same amounts. Treated bentonite meets the American Petroleum Institute's requirements of having a Viscometer Dial Reading of 30 or more at 600 rpm; a Yield Point/Plastic Viscosity Ratio of 3 or more; a Filtrate Volume of 15.0 cubic cm or less; a Residue greater than 75 micrometers of 4.0 wt. % or less; and a Moisture of 10.0 wt. % or less. Such treated bentonite must yield approximately 120 to 280 barrels of 15 centipoises mud per ton, and preferably about 180 to 240 barrels per ton. Standard testing procedures for such properties can be found at the API's Specification 13A.

As described, the emulsion for use during cold application is comprised substantially of a bitumen, water, and a substantially fully hydrated colloidal clay. The emulsion preferably comprises about 5–50% bitumen by weight, about 1.5–25% colloidal clay by weight and/or about 15–55% water by weight.

In another description of the invention, the emulsion comprises a continuous phase of water and a colloidal clay; and a discontinuous phase of a high melt bitumen. In such an emulsion, the colloidal clay is preferably substantially fully hydrated. As stated above the preferred colloidal clay is treated bentonite. The emulsion preferably comprises by weight: 5–50% bitumen, 3–25% colloidal clay, 15–55% water and 0.1–2% specialty additives. The water is preferably substantially de-ionized, although various levels of ions in the water may be desired in order to provide a specific formulation.

DETAILED DESCRIPTION OF PREFERRED EMBODIMENTS

Bentonite is a colloidal clay mineral found throughout the world in deposits of volcanic origin. Chemically, bentonite clay is in the smectite group of colloidal clays which also includes hectorite, saponite and beidellite. Each of these materials exists as three layers which are typically 0.2 to 2.0 microns in diameter and 6 to 10 Angstroms in thickness. The layers may be separated by interlayer galleries containing cations and water. When exposed to water, the clay surface and interlayer cations hydrate and the interlayer spacing increases in a series of steps and may eventually exfolitiate to form a suspension of individual platelets.

Bitumens such as asphalt and coal tar are manufactured by a variety of methods producing types and grades of different specifications. The properties range from soft and flowable to hard and brittle. Bitumen has uses in coating, sealing, and adhesive applications in construction and industrial applications. It is thermoplastic in nature, that is, it needs to be heated above their melting point in order to be applied without a liquid vehicle.

Asphalt is a bitumen derived from a number of materials such as, for example, petroleum, gilsonite, shale oil, coal tar and the like. It is typically a viscous black mixture of compounds of parafinnic, cycloaliphatic and aromatic compounds. It may also contain sulfur, nitrogen and oxygen. While asphalt can be obtained from natural sources it is primarily derived as the residue of petroleum distillation (e.g. the bottom product of a vacuum distillation of a topped crude). Although not limited, preferred grades have a penetration value of (ASTM D5) of no more than 300 dmm, preferably 50 to 200 dmm, and conform in general to ASTM D312, D946 or D449. The asphalt can be utilized in the form of an aqueous emulsion readily available in the trade, see ASTM D1227, and thus may have a water content of about 40–60 wt. %.

Coal tar is a bitumen derived from crude coal tar, water gas tar, oil gas tar or from a combination of such tars with their constituents. Coal tar is black, viscous, with naphthalene-like odor, amorphous residue resulting mainly from the distillation of coal. The majority of its composition is polynuclear aromatic compounds such as aromatic hydrocarbon, naphthalenic, phenolic, anthracenic, quinolinic compounds with traces of insoluble materials. Different grades have different float tests and softening points. Although this invention is not constrained to such limitations, the preferred coal tars have a float test at 122° F. ranging from about 75–230 seconds, and more preferably from about 180–220 seconds, and conform in general to the specification outlined by RT-10 (Road tar-10), RT-11 and RT-12 in ASTM D490. The coal tar can be utilized in the form of an aqueous emulsion readily available in the trade (see Federal Specification RP355e) and thus has a maximum water content of about 53 wt. %.

Surprisingly, it has been found that certain high efficiency, low sodium bentonites, when dispersed under high-speed mixers in the presence of certain additives can become substantially fully hydrated and form water-based slurries that may be blended with bitumens such as asphalt or coal tar to form stable emulsions for use as cold application sealants, coatings and/or mastics. In such dispersions the bentonite is substantially fully hydrated by the water such that it cannot absorb substantially any more water.

The use of bentonite improves the emulsion beyond achieving emulsion stability and the ability to emulsify high melt asphalts. First, it provides the emulsion with thixotropic viscosity in which the emulsion becomes fluid when stirred or shaken and returns to the semisolid state upon standing. Such behavior greatly reduces settling and storage separation between the slurry and cutback which allows for little or no stirring before use since the components need not be mixed back together.

Second, the presence of bentonite in the emulsion facilitates ease of formulation since various fibers, fillers and resins, among other additives, can be compounded in the emulsion for precise and stable viscosity control. Furthermore, such emulsions are not subject to bacteria degradation. Such characteristics result in emulsions which are superior to asbestos-containing products without having the drawbacks associated with asbestos.

In addition, such bentonite-including emulsions have superior application characteristics including longer open time, greater ease when spreading the emulsion, greater control of spread rates, more uniform film application thicknesses and applicability on damp surfaces.

The inventive emulsion also has reduced film stresses and tensions when dried, meaning that the compound is less prone to cracks and, ultimately, failure. The more durable surface translates into superior abrasion resistance, superior track resistance, resistance to softening when warmed and superior solvent resistance.

Lastly, the emulsion including bentonite is less costly to produce than current products.

A preferred process of producing emulsified bitumens is as follows:

1. Bentonite is added to clean water in a high-speed mixing agitator such that the bentonite comprises about 3–8% of the mixture. (Depending on the intended use of the emulsion, the bentonite may comprise about 1.5–8% of the emulsion.) When the clay is dispersed during mixing the clay becomes substantially fully hydrated and the mixture turns into a clay slurry. The slurry temperature is preferably about 60 to 120° F. The viscosity of the slurry is preferably between 20,000–180,000 centipoises at 77° F.

2. The bitumen (asphalt, coal tar, or both) is heated to 250 to 350° F.

3. The slurry and bitumen are combined into a mixture of emulsified bitumen through a process such as a dispersing type (batch to batch) or colloid mill type (continuous) system.

The specifications of a resulting emulsified asphalt meet ASTM D1227, Standard Specification for Emulsified Asphalt Used as Protective Coating for Roofing. The specifications of a resulting emulsified coal tar meet ASTM D5727 Standard Specification for Emulsified Refined Coal Tar and ASTM D3320 Standard Specification for Emulsified Coal-Tar Pitch.

| A preferred range of the components is about: | |
|---|---|
| Water | 15–55 wt. % |
| Bentonite | 1.5–8 wt. % |
| Bitumen | 5–50 wt. % |
| Specialty additives | 0.1–2 wt. % |
| | 100% |

The specialty additives may includes mineral salt to increase emulsability, complex organic acids such as acetic acid etc., to bring the pH to a range of 4–6 or to enhance emulsability, polyacrylic acids and/or vinyl acrylic terpolymers which also aid emulsion formation. Inert fillers such as pulverized limestone powder, talc perlite, and the like can be used in an amount of about 0–50 wt. %. Inert fibers such as cellulosic, fiberglass, polyolefin, and the like can be used in an amount of about 0–25 wt. %. The suggested range of water is in addition to that derived from asphalt and cold tar aqueous emulsions employed.

The invention will be better understood by reference to the following examples:

EXAMPLE 1

| The preparation of an emulsified AC-20 type asphalt using bentonite slurry. | |
|---|---|
| Water | 51 wt. % |
| Bentonite | 1.5–8.0 wt. % |
| AC-250 Asphalt (115° F. melting pt.) | 46.3–47.3 wt. % |
| pH adjuster | 0.2 wt. % |
| | 100% |

EXAMPLE 2

| The preparation of an emulsified PPA hard asphalt using bentonite slurry. | |
|---|---|
| Water | 51 wt. % |
| Bentonite | 1.5–8.0 wt. % |
| Hard PPA Asphalt (up to 185° F. melt pt.) | 45.3–46.3 wt. % |
| pH adjuster | 0.2 wt. % |
| | 100% |

EXAMPLE 3

| The preparation of an emulsified coal tar using bentonite slurry. | |
|---|---|
| Water | 52 wt. % |
| Bentonite | 7.0 wt. % |
| Coal tar | 41 wt. % |
| | 100% |

EXAMPLE 4

| The preparation of an emulsified polymer(s)-added asphalt and bentonite slurry. | |
|---|---|
| Water | 52 wt. % |
| Bentonite | 2.5–8.0 wt. % |
| Asphalt with polymer(s) | 44.3–45.3 wt. % |
| pH adjuster | 0.2 wt. % |
| | 100% |

The following examples utilize the emulsions of the preceding examples.

EXAMPLE 5

| Asphalt emulsion roofing composition. | |
|---|---|
| Example 1 or 2 | 20–60 wt. % |
| Reinforced fibers | 0.5–15 wt. % |
| Fillers/Extenders | 1.0–20 wt. % |
| Water | 3–20 wt. % |
| Specialty Additives | 0.1–1.0 wt. % |
| | 100% |

EXAMPLE 6

| Asphalt emulsion reflective aluminum composition. | |
|---|---|
| Example 1, 2 or 3 | 20–60 wt. % |
| Special treated aluminum paste | 5–15 wt. % |
| Fillers/Extenders | 2–20 wt. % |
| Water | 3–20 wt. % |
| Specialty Additives | 0.1–5 wt. % |
| | 100% |

EXAMPLE 7

| Bituminous black top driveway sealer | |
|---|---|
| Example 1, 2, 3, or 4 | 15–50 wt. % |
| Fillers/Extenders | 2–20 wt. % |
| Sand | 5–20 wt. % |
| Water | 10–40 wt. % |
| Specialty Additives | 0.2–5 wt. % |
| | 100% |

EXAMPLE 8

| Bituminous patching composition | |
|---|---|
| Example 1, 2, 3, or 4 | 50–80 wt. % |
| Fillers/Extenders | 5–15 wt. % |
| Fibers | 1–5 wt. % |
| Water | 1–10 wt. % |
| Specialty Additives | 0.2–2.0 wt. % |
| Bentonite slurry (1) | 2–35 wt. % |
| | 100% |

EXAMPLE 9

| Bituminous bonding adhesives | |
|---|---|
| Example 1, 2, 3, or 4 | 30–60 wt. % |
| Adhesive Enhancer Polymer Resins | 1–20 wt. % |
| Water | 1–10 wt. % |
| Fillers/Extenders | 2–10 wt. % |
| Fibers | 0.5–5 wt. % |
| Specialty Additives | 0.2–5 wt. % |
| Bentonite slurry (1) | 2–60 wt. % |
| | 100% |

EXAMPLE 10

| Bituminous roof mastic | |
| --- | --- |
| Example 1, 2, 3, or 4 | 40–70 wt. % |
| Bituminous cutback solvent | 0–30 wt. % |
| Fillers/Extenders | 2–20 wt. % |
| Specialty Additives | 0.5–3.0 wt. % |
| Bentonite slurry (1) | 0–55 wt. % |
| | 100% |

EXAMPLE 11

| Bituminous waterproofer or vapor barrier | |
| --- | --- |
| Example 1, 2, 3, or 4 | 70–90 wt. % |
| Wax emulsion | 0–15 wt. % |
| Silicon emulsion | 0–15 wt. % |
| Water | 1–10 wt. % |
| Specialty Additives | 0.1–5 wt. % |
| | 100% |

EXAMPLE 12

| Primer/weed controller/road dust suppressor | |
| --- | --- |
| Example 1, 2, 3, or 4 | 10–50 wt. % |
| Water | 10–60 wt. % |
| Surface active additives | 0.3–3 wt. % |
| Specialty Additives | 0.1–6 wt. % |
| | 100% |

The advantages of the invention include higher solids emulsions; the ability to emulsify high melt bitumens, the ability to retain higher melt points of harder asphalts; no need for coalescing solvents despite high glass transition temperatures; no water sensitive surface active agents needed; superior binding and wetting of pigments, fibers and fillers; non-porous harder films; no setting or separation during storage; excellent wetting of substrate and adhesion to old substrates; easier more uniform application due to thixotropic nature; fast dry; superior color (jetness); superior hydrophobic nature; superior abrasion resistance; superior track resistance (less softening when hot); much longer useful life and weather resistance; and a good-sealed surface for recoat when necessary.

Although the previous examples are offered, it is understood that the disclosure of the preferred form does not limit the intent of the invention and changes can occur without departing from the spirit and scope of the invention. For instance, selected bentonites can be used in higher concentrations. Various modes of carrying out the invention are contemplated as being within the scope of the following claims which particularly point out and distinctly claim the subject matter regarded as the invention.

The claimed invention is:

1. A method of preparing an emulsion for use during cold applications, the method comprising:

creating a slurry of water and substantially fully hydrated colloidal clay by mixing the water and colloidal clay in a disperser at between about 1500–5000 rpms;

providing a bitumen;

melting the bitumen; and mixing the bitumen with the slurry to create the emulsion.

2. The method of claim 1 wherein the water and colloidal clay are mixed until the colloidal clay is substantially fully hydrated.

3. The method of claim 2 wherein the clay is substantially fully hydrated in less than 30 minutes.

4. The method of claim 1 wherein the bitumen comprises about 5–50% of the emulsion by weight.

5. The method of claim 4 wherein the colloidal clay comprises about 1.5–8.0% of the emulsion by weight.

6. The method of claim 5 wherein the water comprises about 15–55% of the emulsion by weight.

7. The method of claim 1 wherein the bitumen has a melt point of at least 180° F.

8. The method of claim 7 wherein the bitumen has a melt point of at least about 200° F.

9. The method of claim 1 wherein the bitumen is asphalt or coal tar.

10. The method of claim 1 wherein the colloidal clay is treated bentonite.

11. An emulsion for use during cold application, the emulsion comprised substantially of:

a bitumen;

water; and a substantially fully hydrated colloidal clay, the colloidal clay being substantially fully hydrated by mixing the water and the colloidal clay in a disperser at between 1500–5000 rpms.

12. The emulsion of claim 11 comprising about 5–50% bitumen by weight.

13. The emulsion of claim 11 comprising about 1.5–8% colloidal clay by weight.

14. The emulsion of claim 11 comprising about 15–55% water by weight.

15. The emulsion of claim 11 wherein the water is substantially de-ionized.

16. The emulsion of claim 11 wherein the bitumen has a melt point of at least about 200° F.

17. An emulsion for use during cold application, the emulsion comprising:

a continuous phase of water and a colloidal clay, the water being substantially de-ionized; and a discontinuous phase of a bitumen.

18. The emulsion of claim 17 wherein the colloidal clay is substantially fully hydrated.

19. The emulsion of claim 18 wherein the colloidal clay is treated bentonite.

20. The emulsion of claim 17 wherein the emulsion comprises by weight %: 5–50% bitumen, 3–8% colloidal clay, 15–55% water and 0.1–2% specialty additives.

* * * * *